United States Patent
Kato et al.

(10) Patent No.: US 11,409,334 B2
(45) Date of Patent: Aug. 9, 2022

(54) DEVICE WITH OPENING AND CLOSING PERFORMANCE

(71) Applicant: Huawei Technologies Co., Ltd., Shenzhen (CN)

(72) Inventors: Hideo Kato, Yokohama (JP); Yaming Jiang, Wuhan (CN); Lei Bai, Wuhan (CN); Guanjun Zhang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/253,878

(22) PCT Filed: Jun. 20, 2018

(86) PCT No.: PCT/CN2018/092046
§ 371 (c)(1),
(2) Date: Dec. 18, 2020

(87) PCT Pub. No.: WO2019/241940
PCT Pub. Date: Dec. 26, 2019

(65) Prior Publication Data
US 2021/0247818 A1 Aug. 12, 2021

(51) Int. Cl.
*G06F 1/16* (2006.01)
*H04M 1/02* (2006.01)

(52) U.S. Cl.
CPC .......... *G06F 1/1681* (2013.01); *G06F 1/1616* (2013.01); *H04M 1/022* (2013.01)

(58) Field of Classification Search
CPC combination set(s) only.
See application file for complete search history.

(56) References Cited

U.S. PATENT DOCUMENTS

| | | | |
|---|---|---|---|
| 9,964,995 B1 | 5/2018 | Morrison et al. | |
| 10,871,016 B2 * | 12/2020 | Zhai | G06F 1/1632 |
| 11,066,861 B2 * | 7/2021 | Zhu | G06F 1/1669 |
| 11,068,024 B2 * | 7/2021 | Zhu | G06F 15/0216 |
| 2009/0056073 A1 | 3/2009 | Lin | |

(Continued)

FOREIGN PATENT DOCUMENTS

| CN | 103291737 A | 9/2013 |
|---|---|---|
| CN | 104047952 A | 9/2014 |

(Continued)

*Primary Examiner* — Lisa Lea-Edmonds
(74) *Attorney, Agent, or Firm* — Conley Rose, P.C.

(57) ABSTRACT

A device includes a first body, a second body, and a rotating shaft connection mechanism configured to connect the first body and the second body. The rotating shaft connection mechanism includes N rotating shaft components, a connection component, and N movable linear components corresponding to the N rotating shaft components. An $i^{th}$ linear component is wound around a rotating shaft of a corresponding $i^{th}$ rotating shaft component. A segment of extending linear component and a segment of extending linear component separately pass through the connection component. When the second body rotates relative to the first body, the segment of linear component and the segment of linear component have different rotation radii.

20 Claims, 6 Drawing Sheets

(56) References Cited

U.S. PATENT DOCUMENTS

| | | | |
|---|---|---|---|
| 2016/0060931 A1 | 3/2016 | Zhang et al. | |
| 2016/0083989 A1* | 3/2016 | Kuo | |
| 2019/0032380 A1* | 1/2019 | Wu | G06F 1/1616 |
| 2019/0369663 A1* | 12/2019 | Zhu | G06F 1/1681 |
| 2021/0018960 A1* | 1/2021 | Kato | G06F 1/1618 |
| 2021/0271294 A1* | 9/2021 | Liao | H04M 1/0216 |
| 2021/0368032 A1* | 11/2021 | Liao | H04M 1/022 |
| 2022/0011812 A1* | 1/2022 | Lin | G06F 1/203 |
| 2022/0011828 A1* | 1/2022 | Zhan | G06F 1/1616 |

FOREIGN PATENT DOCUMENTS

| | | |
|---|---|---|
| CN | 204900509 U | 12/2015 |
| CN | 105468091 A | 4/2016 |
| CN | 105545928 A | 5/2016 |
| CN | 105760737 A | 7/2016 |
| CN | 205715242 U | 11/2016 |
| CN | 206036017 U | 3/2017 |
| EP | 2557761 A1 | 2/2013 |
| WO | 2008136402 A1 | 11/2008 |

* cited by examiner

--Prior Art--

DEVICE WITH OPENING AND CLOSING PERFORMANCE

CROSS-REFERENCE TO RELATED APPLICATIONS

This application is a U.S. National Stage of International Patent Application No. PCT/CN2018/092046 filed on Jun. 20, 2018, which is hereby incorporated by reference in its entirety.

TECHNICAL FIELD

This application relates to the field of structures, and more specifically, to a device with opening and closing performance.

BACKGROUND

Currently, a laptop computer generally includes a first body including a chassis, a second body including a display, and a rotating shaft connection mechanism configured to connect the first body and the second body. When using the laptop computer, a user opens the second body to an appropriate angle by using the rotating shaft connection mechanism, so as to facilitate operations. When the user does not use or finishes using the laptop computer, the user covers the second body on the first body by using the rotating shaft connection mechanism.

However, two ends of the existing rotating shaft connection mechanism need to be respectively fastened on the first body and the second body, and a rotating shaft center of the rotating shaft connection mechanism needs to coincide with a rotation center of the second body. This affects a service life of a rotating shaft and further affects opening and closing durability of the laptop computer.

Therefore, a technology needs to be provided to improve the opening and closing durability of the laptop computer.

SUMMARY

This application provides a device with opening and closing performance, to improve a service life of a rotating shaft connection mechanism by reducing a rotation angle of a rotating shaft, and improve opening and closing durability of the device.

According to a first aspect, a device with opening and closing performance is provided. The device includes:

a first body and a second body;

a rotating shaft connection mechanism configured to connect the first body and the second body, where the rotating shaft connection mechanism includes:

N rotating shaft components, where an $i^{th}$ rotating shaft component includes a rotating shaft, and i is a positive integer;

a connection component, where one end of the connection component is connected to the first body, and the other end of the connection component is connected to the second body; and N movable linear components, where an $i^{th}$ linear component corresponds to the $i^{th}$ rotating shaft component, the $i^{th}$ linear component is wound around a rotating shaft of the $i^{th}$ rotating shaft component, a first segment of linear component and a second segment of linear component extending along the rotating shaft separately pass through the connection component, and an end of the first segment of linear component and an end of the second segment of linear component are connected to the second body, where when the second body rotates relative to the first body in a first direction, a rotation radius of the first segment of linear component is different from a rotation radius of the second segment of linear component, the first direction is perpendicular to a second direction, the second direction is a direction extending from an end that is of the first body and that is away from the connection component to an end that is of the first body and that is close to the connection component, and a plane formed by the first direction and the second direction is parallel to a plane in which the first body faces a surface of the second body.

Therefore, the N rotating shaft components, the N linear components, and the connection component are disposed on the device with opening and closing performance provided in this embodiment of this application. Two segments of linear components extending out of each linear component from a wound rotating shaft of a corresponding rotating shaft component separately pass through the connection component. When the second body rotates relative to the first body, the two segments of linear components of each linear component have different rotation radii. In this way, when the second body rotates relative to the first body, because the two segments of linear components have different rotation radii, a length difference may be generated between the two segments of linear components. The length difference may pull the rotating shaft of the rotating shaft component, so that friction is generated between the rotating shaft and the linear component that is wound around an outer wall of the rotating shaft. This generates a torsion force, to effectively reduce a rotation angle of the rotating shaft, improve a service life of the rotating shaft connection mechanism, and improve opening and closing durability of the device (for example, a laptop computer).

According to another aspect, compared with the prior art, when rotation angles of the rotating shaft are the same, this solution may further improve the opening and closing angle of the device.

According to still another aspect, because a rotating shaft center of the rotating shaft connection mechanism does not need to coincide with a rotation center of the second body, a position of the rotating shaft connection mechanism may be flexibly placed.

In a possible implementation, the connection component includes N groups of holes, an $i^{th}$ group of holes correspond to the $i^{th}$ rotating shaft component, the $i^{th}$ group of holes include a first hole and a second hole, the first segment of linear component extending out of the $i^{th}$ linear component along the rotating shaft of the $i^{th}$ rotating shaft component passes through the first hole, and the second segment of linear component extending out of the linear component along the rotating shaft of the $i^{th}$ rotating shaft component passes through the second hole.

In a possible implementation, when the second body rotates relative to the first body in the first direction, a distance between the first hole and a first plane is equal to a distance between the second hole and the first plane, the first plane passes through a central position of the first body in the first direction, and the first plane is perpendicular to the first direction.

Therefore, positions of the two holes in each group of holes are set, so that the distance between one hole and the first plane is equal to the distance between the other hole and the first plane. When same torsion force requirements are met, a structure size can be reduced, and an overall size of the device can be reduced.

In a possible implementation, the connection component includes a plurality of connection blocks.

Therefore, the connection component is formed by the plurality of connection blocks, so that a motion direction of the second body relative to the first body can be increased, and the motion direction of the second body relative to the first body is less limited.

In a possible implementation, a projection of each connection block on a second plane is in a semicircular shape, and a convex part of a semicircular shape of a first connection block in two adjacent connection blocks extends into a concave part of a semicircular shape of a second connection block, two ends of the concave part of the semicircular shape of the second connection block are respectively in contact with two areas of the convex part of the semicircular shape of the first connection block, and the second plane is perpendicular to the first direction.

Therefore, the projection of the connection block on the second plane is designed as the semicircular shape, and the two adjacent connection blocks are connected by using the semicircular structures, so that a size of the connection component in a width direction of the connection component can be flexibly controlled.

In a possible implementation, the $i^{th}$ rotating shaft component further includes a friction sheet, the rotating shaft of the $i^{th}$ rotating shaft component is nested inside the friction sheet, the friction sheet is in contact with two opposite surfaces of the rotating shaft, and the $i^{th}$ linear component is wound around the rotating shaft and the friction sheet.

Therefore, the friction sheet is disposed in the rotating shaft component, so that the linear component is wound around the rotating shaft and the friction sheet. When the second body rotates relative to the first body, a torsion force can be provided through a friction force between the rotating shaft and the friction sheet in a rotation process. Because there is a relatively large contact surface between the friction sheet and the rotating shaft, a determined torsion force may relatively easily be calculated by using a size of the contact surface, and a torsion force value may further be better controlled based on an actual requirement.

In a possible implementation, the $i^{th}$ rotating shaft component further includes a base having a convex part, the rotating shaft is a hollow rotating shaft, the base is fastened to the first body, the convex part of the base passes through the hollow rotating shaft, and the base is in contact with the two opposite surfaces of the hollow rotating shaft.

In a possible implementation, N=2, and the two rotating shaft components are symmetrically placed on two sides of the central position of the first body in the first direction.

Therefore, the two rotating shaft components are symmetrically placed on the two sides of the central position of the first body in the first direction, so that synchronization performance of the rotating shaft connection mechanism can be effectively improved.

In a possible implementation, a length of the connection component in the first direction is the same as a length of the first body in the first direction, or a length of the connection component in the first direction is the same as a length of the second body in the first direction.

In a possible implementation, the $i^{th}$ linear component includes a metal wire or a nylon rope.

In a possible implementation, the device is a laptop computer, a chassis is disposed on the first body, and a display is disposed on the second body.

In a possible implementation, the connection component is made of plastic or metal.

DESCRIPTION OF EMBODIMENTS

The following describes technical solutions of this application with reference to accompanying drawings.

Figure 1:
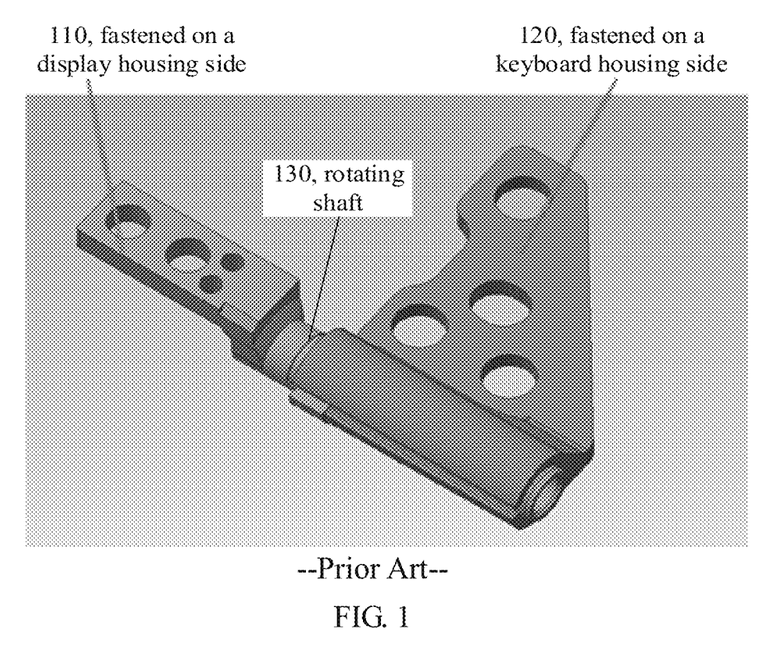
FIG. 1 is a schematic structural diagram of a rotating shaft connection mechanism of a laptop computer in the prior art.

FIG. 1 shows a rotating shaft connection mechanism of a laptop computer in the prior art. As shown in FIG. 1, one end 110 of the rotating shaft connection mechanism needs to be fastened on a display housing side, and the other end 120 of the rotating shaft connection mechanism needs to be fastened on a keyboard housing side. A rotating shaft center of the rotating shaft connection mechanism needs to coincide with a rotation center on the display housing side. This means that a rotation angle on the display housing side is the same as a rotation angle of a rotating shaft of the rotating shaft connection mechanism. When the laptop computer is opened and closed many times, a service life of the rotating shaft is affected, and opening and closing durability of the laptop computer is further affected.

Based on this, an embodiment of this application provides a device with opening and closing performance. A rotating shaft connection mechanism included in the device can effectively improve a service life of a rotating shaft, and further effectively improve opening and closing durability of the device (for example, a laptop computer).

It should be understood that the device in this embodiment of this application may be a laptop computer, or may be any terminal device with opening and closing performance. This embodiment of this application is not limited thereto. For example, the device may be a tablet computer or a collapsible mobile phone.

With reference to FIG. 2 to FIG. 11, the following describes in detail a device in an embodiment of this application by using an example in which the device is a laptop computer.

Figure 2:
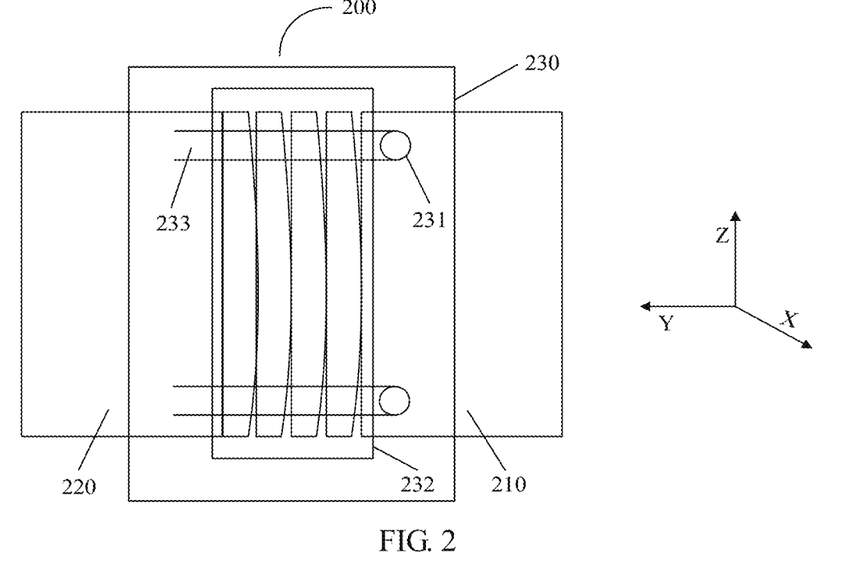
FIG. 2 and FIG. 3 are schematic structural diagrams of a device having an opening and closing function according to an embodiment of this application.
Figure 3:
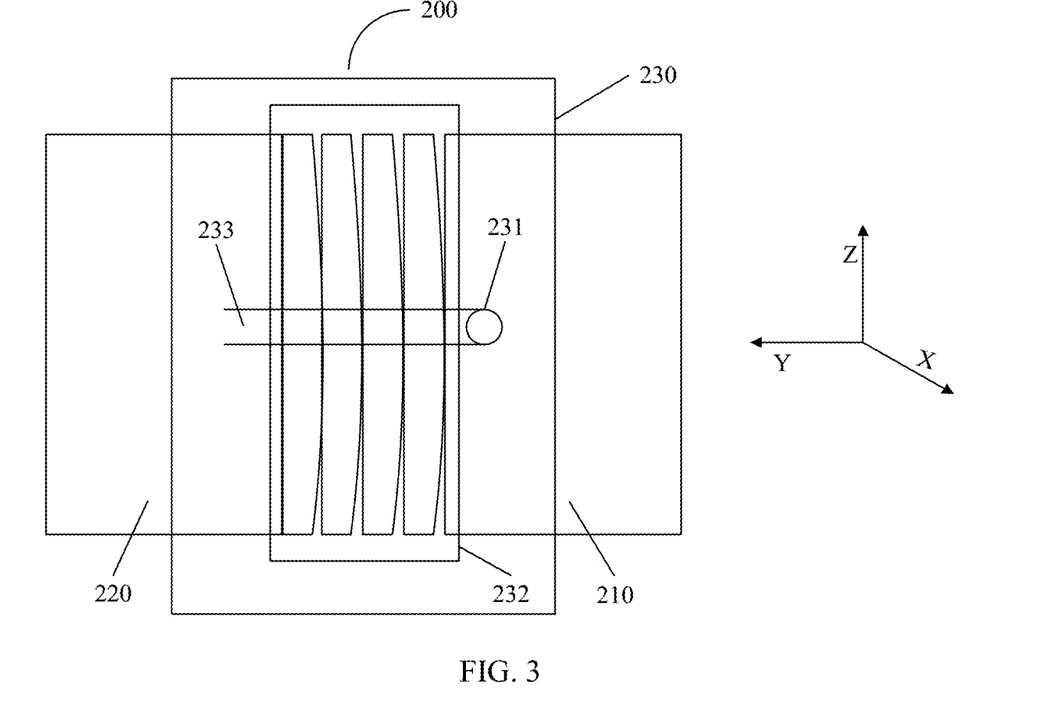

The device provided in this embodiment of this application includes a first body 210, a second body 220, and a rotating shaft connection mechanism 230 configured to connect the first body 210 and the second body 220. For the laptop computer, the first body 210 includes components such as a keyboard and a chassis, and the second body 220 includes components such as a display. The rotating shaft connection mechanism 230 includes N rotating shaft components 231, one connection component 232, and N movable linear components 233. The N rotating shaft components 231 are in a one-to-one correspondence with the N linear components 233, one linear component 233 is wound around a corresponding rotating shaft component 231, and two segments of linear components extending along the rotating shaft component 231 separately pass through the connection component 232. Ends of the two segments of linear components are connected to the second body 220. When the second body 220 rotates relative to the first body 210, the two segments of linear components have different rotation radii.

N is a positive integer greater than or equal to 1, and the N rotating shaft components may be placed in any position of the laptop computer based on an actual requirement. For example, as shown in FIG. 2, N=2, and the two rotating shaft components are respectively disposed at two ends of the laptop computer. Correspondingly, the two linear components are also disposed at the two ends of the laptop computer based on positions of the two rotating shaft components, and each linear component is connected to a corresponding rotating shaft component by using the connection component. For another example, as shown in FIG. 3, N=1, and one rotating shaft component may be placed in a middle position of the laptop computer in a length direction. Correspondingly, the linear component may also be arranged in the middle position of the device in the length direction based on the position of the rotating shaft component, the linear component is connected to the rotating shaft component by using the connection component. It should be understood that the quantity N and the positions of the N rotating shaft components and the corresponding N linear components on the laptop computer are merely examples, and shall not constitute a limitation on this embodiment of this application.

The following describes in detail the rotating shaft connection mechanism 230 in this embodiment of this application.

First, for ease of understanding and description, a three-dimensional coordinate system, and a position relationship between a connection component and a device in the accompanying drawings in this embodiment of this application are described.

A length direction of the connection component 232 may be understood as a length direction of the first body 210 or the second body 220. In addition, the length direction of the connection component 232 does not change with an opening and closing process of the device. For the laptop computer, the length direction of the connection component 232 may be understood as a length direction of the laptop computer. A width direction of the connection component 232 may be understood as a connection direction of connecting linear component 233 by the rotating shaft component 231. A thickness direction of the connection component 232 may be understood as a direction perpendicular to the width direction of the connection component.

When the first body 210 and the second body 220 are in the 180° state shown in FIG. 2, the thickness direction of the connection component 232 is an X direction shown in FIG. 2, or in other words, the X direction may be understood as a thickness direction of the first body 210. The width direction of the connection component 232 is a Y direction shown in FIG. 2. The Y direction may be understood as a direction extending from an end that is of the first body 210 and that is away from the connection component 232 to an end that is close to the connection component 232, or in other words, the Y direction may also be understood as a width direction of the first body 210. The length direction of the connection component 232 is a Z direction shown in FIG. 2. The length direction of the connection component 232 may also be understood as the length direction of the laptop computer, or in other words, the length direction of the connection component 232 may also be understood as the length direction of the first body or the second body.

It should be noted that, the length direction, the width direction, and the thickness direction of the first body 210, the second body 220, and the connection component 232 described above are all relative directions, are based on the orientation or position relationship shown in the accompanying drawings, and are merely intended to simplify descriptions of the embodiments of this application. The directions each are not an indication or implication that the apparatus must have a specific orientation, and is constructed and operated in a specific orientation, and does not constitute a limitation in this embodiment of this application.

For example, if a size of the device in the Z direction is less than a size of the device in the Y direction, the Z direction may also be referred to as a width direction of the device, or the Z direction may be referred to as a length direction of the device.

It should be understood that, when the first body 210 and the second body 220 are in the 180° state shown in FIG. 2, a YZ-plane formed by the Y direction and the Z direction may be understood as a plane on which any one of two surfaces opposite to the first body 210 and the second body 220 is located. For example, for the laptop computer, the YZ-plane may be a plane on which a surface of the keyboard of the first body 210 is located, or the YZ-plane may be a plane on which a surface of the display of the second body 220 is located.

When the second body 220 moves relative to the first body 210, the YZ-plane may be understood as a plane on which a surface of the first body 210 relative to the second body 220 is located.

The following separately describes components of the rotating shaft connection mechanism 230.

N Rotating Shaft Components

An $i^{th}$ rotating shaft component 231 includes a rotating shaft 2312, and the rotating shaft component 231 is connected to the first body 210. The $i^{th}$ rotating shaft component is any one of the N rotating shaft components.

Figure 4:
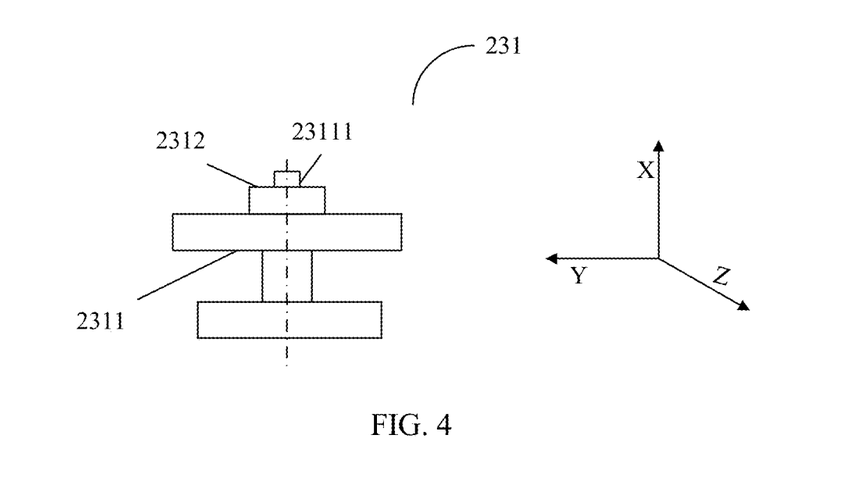
FIG. 4 is a schematic structural diagram of a rotating shaft component according to an embodiment of this application.

In a possible implementation, as shown in FIG. 4, the rotating shaft component 231 includes a base 2311 having a convex part, and the rotating shaft 2312 is a hollow rotating shaft. The base 2311 is fastened to the first body 210, the convex part 23111 of the base 2311 passes through the hollow rotating shaft 2312, and the base 2311 is in contact with two opposite surfaces of the hollow rotating shaft 2312.

That the convex part of the base 2311 passes through the hollow rotating shaft may be understood as that the rotating shaft 2312 is fastened at a position of the first body 210, so that the rotating shaft 2312 can rotate around a specific direction.

As an example instead of a limitation, a specific structure of the rotating shaft component 231 shown in FIG. 4 is merely an example, and any implementation in which the rotating shaft can be positioned falls within the protection scope of this embodiment of this application.

Connection Component

Still referring to FIG. 2 or FIG. 3, one end of the connection component 232 is connected to the first body 210, and the other end of the connection component 232 is connected to the second body 220.

The connection component 232 is disposed in a middle position between the rotating shaft component 231 and the linear component 233, and is also configured to connect the rotating shaft component 231 and the linear component 233.

For a size of the connection component, in a possible implementation, a length of the connection component 232 in a first direction is the same as a length of the first body 210 in the first direction, or a length of the connection component 232 in a first direction is the same as a length of the second body 220 in the first direction.

The first direction is the length direction of the first body 210 or the second body 220. In FIG. 2 or FIG. 3, the length direction of the first body 210 or the second body 220 is the Z direction.

Therefore, as shown in FIG. 2 or FIG. 3, the length of the connection component 232 in the Z direction is the same as the length of the first body 210 in the Z direction, or the length of the connection component 232 in the Z direction is the same as the length of the second body 220 in the Z direction.

It should be understood that the length of the connection component 232 in the first direction may also be less than or greater than the length of the first body 210 in the first direction, provided that the connection component 232 can cooperate with the first body 210 and the second body 220 to complete opening and closing performance of the device. All implementable solutions fall within the protection scope of this application.

In this embodiment of this application, to enable the linear component 233 to pass through the connection component 232, in a possible implementation, the connection component 232 is provided with N groups of holes 2321 that pass through the connection component 231. An $i^{th}$ group of holes 2321 correspond to the $i^{th}$ rotating shaft component 231, and the $i^{th}$ group of holes 2321 include a first hole 23211 and a second hole 23212. When the second body 220 rotates relative to the first body 210 in the first direction, a rotation radius of the first hole 23211 is different from a rotation radius of the second hole 23212. The $i^{th}$ group of holes 2321 are any one group of holes in N groups of holes 2321 and correspond to the $i^{th}$ rotating shaft component.

Figure 5:
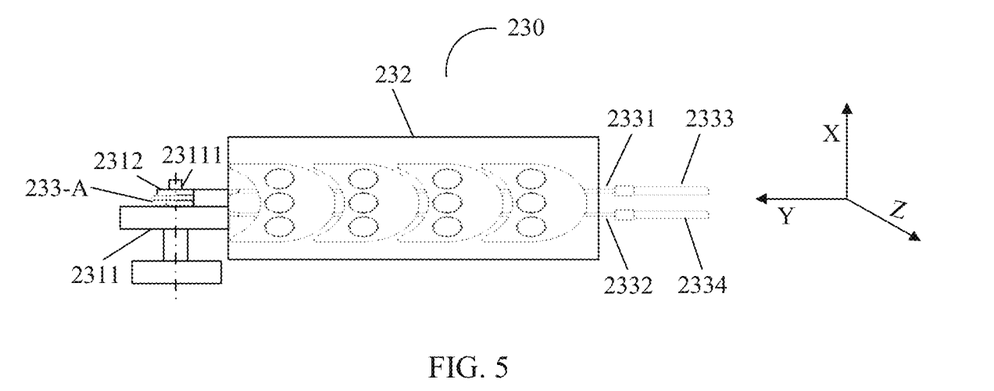
FIG. 5 is a schematic structural diagram of a rotating shaft connection mechanism according to an embodiment of this application.
Figure 6:
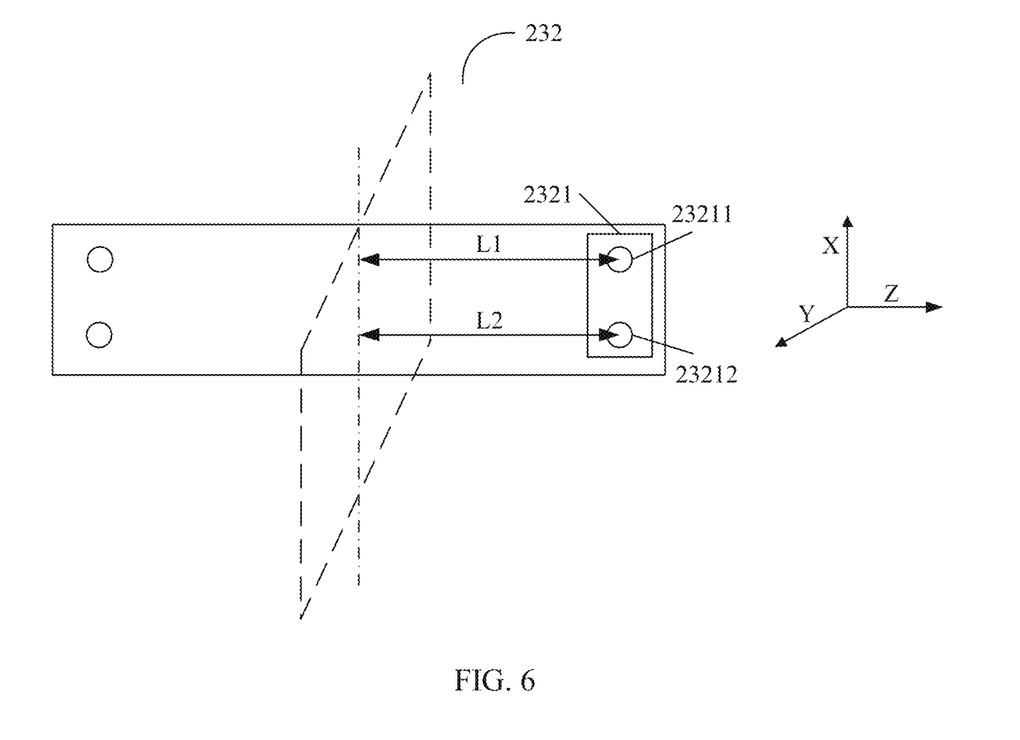
FIG. 6 to FIG. 8 are schematic structural diagrams of a connection component according to an embodiment of this application.
Figure 7:
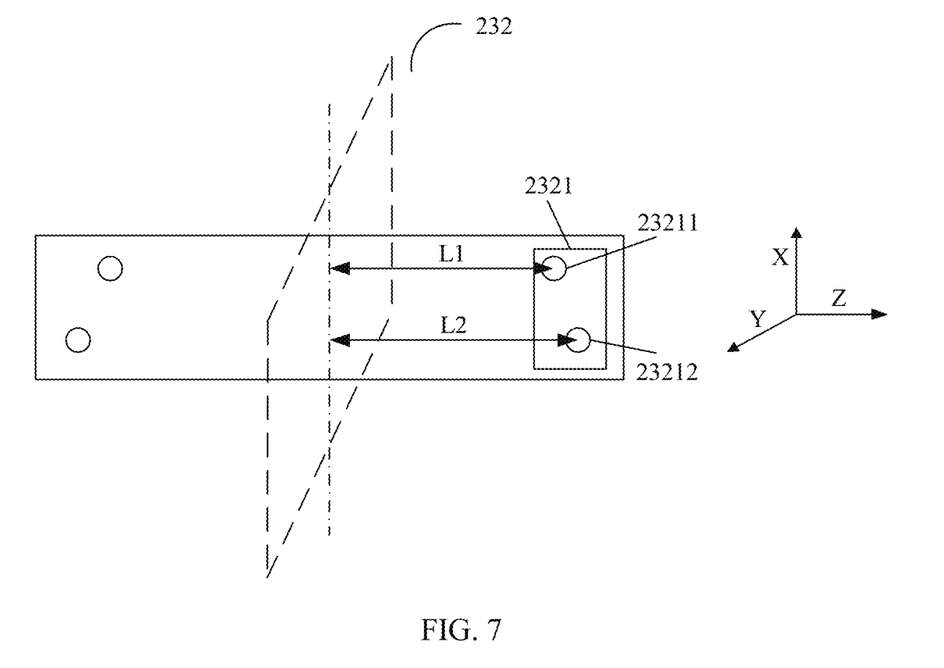

Herein, for corresponding component numbers of the foregoing components, refer to FIG. 5, FIG. 6, and FIG. 7. FIG. 6 and FIG. 7 are schematic structural diagrams of the N groups of holes of the connection component 232 according to an embodiment of this application. When the first body 210 and the second body 220 are in a 180° state shown in FIG. 2 or FIG. 3, the connection component 232 is in the fully expanded state shown in FIG. 2, FIG. 3, or FIG. 5. FIG. 6 or FIG. 7 is a sectional view of the connection component 232 parallel to an XZ-plane.

Specifically, to connect the rotating shaft component 231 to the linear component 233, the N groups of holes 2321 may be disposed in the connection component 231. The $i^{th}$ group of holes 2321 include two holes, the $i^{th}$ group of holes 2321 pass through the width direction of the connection component 232, and there is a height difference between the two holes in the $i^{th}$ group of holes 2321 in the thickness direction of the connection component 232. In this way, when the second body 220 rotates relative to the first body 210 in the first direction, the two holes may have different rotation radii.

It should be emphasized that, because a rotation center of a rotating shaft of the rotating shaft connection mechanism in this embodiment of this application no longer coincides with a rotation center of the display housing side (namely, the second body) of the laptop computer, the rotating shaft connection mechanism has relatively high flexibility in motion. Therefore, in this embodiment of this application, a rotation motion of the second body 220 relative to the first body 210 may not be rotation in a strict sense, and may be a rotation motion that approximately rotates in a direction (for example, the length direction of the first body 210). Correspondingly, when the second body 220 rotates relative to the first body 210, because the rotating shaft connection mechanism moves with the motion of the second body 220, rotation radii of two holes in each group of holes are not radii in a strict sense.

With reference to FIG. 6 and FIG. 7, the following describes in detail a position relationship between the two holes in each group of holes 2321 in the connection component 231.

In a possible implementation, when the second body 220 rotates relative to the first body 210 in the first direction, a distance between the first hole 23211 in the $i^{th}$ group of holes 2321 and a first plane is equal to a distance between the second hole 23212 in the $i^{th}$ group of holes 2321 and the first plane. The first plane passes through a central position of the first body 210 in the first direction. The first plane is perpendicular to the first direction, and the first direction is perpendicular to the second direction. The second direction is a direction extending from an end that is of the first body 210 and that is away from the connection component 232 to an end that is close to the connection component 232.

Specifically, the first direction is the length direction of the connection component 232, or the first direction may be understood as the length direction of the first body 210 or the second body 220, in other words, the first direction is the Z direction. The second direction is the Y direction. The first plane passes through the central position of the first body 210 in the first direction, and is perpendicular to a plane (denoted as a third plane for ease of differentiation and understanding) formed by the first direction and the second direction. The third plane may be understood as a plane on which a surface of the keyboard of the first body 210 is located, or the third plane may be understood as the YZ-plane. From another perspective, the first plane may also be understood as a plane that passes through the central position of the first body 210 in the first direction and is parallel to an XY-plane.

As shown in FIG. 6, the first plane is a plane that is parallel to the XY-plane and on which a central axis shown by a dot line is located. In the X direction, or in the thickness direction of the connection component, there is a distance difference between the first hole 23211 and the second hole 23212, in other words, a distance between the first hole 23211 and the YZ-plane (namely, the third plane) is different from a distance between the second hole 23212 and the YZ-plane. In addition, a distance L1 between the first hole 23211 and the first plane and a distance L2 between the second hole 23212 and the first plane are the same, or the first hole 2321 and the second hole 23212 are located on a same straight line in the X direction.

In this way, positions of the two holes in each group of holes are set, so that the distance between one hole and the first plane is equal to the distance between the other hole and the first plane. When a same torsion force requirement is met, a structure size can be reduced, and an overall size of a device (for example, a laptop computer) can be reduced.

It should be understood that when the second body 220 rotates relative to the first body 210 in the first direction, and when the first body 210 and the second body 220 are at any angle, the two holes in each group of holes meet the foregoing requirement. When the first body 210 and the second body 220 shown in FIG. 6 are in the 180° state, a structure of the connection component 232 is merely an example, and shall not constitute a limitation on this embodiment of this application.

As described above, there is a height difference between the two holes in each group of holes in the thickness direction of the connection component 232. In this way, when the second body 220 rotates relative to the first body 210, the two holes may have different rotation radii. Therefore, the position relationship between the two holes in each group of holes may be the position relationship shown in FIG. 6, and may also be the position relationship shown in FIG. 7. As shown in FIG. 7, there is a height difference between the two holes in each group of holes in the thickness direction of the connection component 232, and the distance between one hole and the first plane may be different from the distance between the other hole and the first plane, in other words, L1 and L2 are different.

Figure 8:
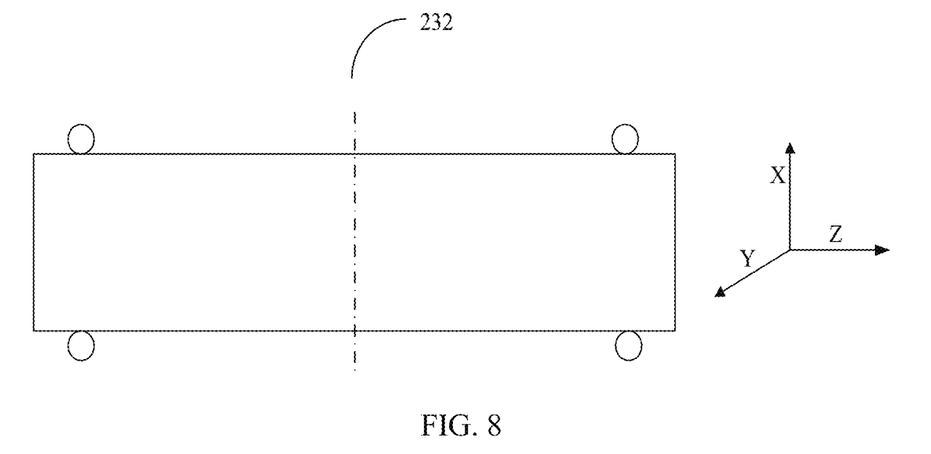

It should be understood that, a manner in which the connection component 232 is connected to the rotating shaft component 231 and the linear component 233 by using the N groups of holes shown in FIG. 5, FIG. 6, or FIG. 7 is merely an example. Any other form of connecting the connection component 233 to the rotating shaft component 231 by using the connection component 232 falls within the protection scope of this embodiment of this application. For example, FIG. 8 is used as an example. A positionable ring-shaped component may be disposed at an upper surface and a lower surface of the connection component 232 in the X direction.

However, it should be noted that, regardless of the structure of the connection component 232, to make two segments of linear components extending out of the rotating shaft component 231 have different rotation radii, there is a distance difference in the thickness direction of the connection component 231 for the structure used to pass through the linear component.

Because the connection component may limit a position of the linear component, the connection component needs to be relatively secure and is not easily deformed. Therefore, in a possible implementation, the connection component may be made of a material that is not easily deformed, such as plastic or metal.

N Movable Linear Components

The $i^{th}$ linear component 233 corresponds to the $i^{th}$ rotating shaft component 231, and the $i^{th}$ linear component 233 is wound around the hollow rotating shaft 2312 of the $i^{th}$ rotating shaft component 231. The first segment of linear component 2331 and the second segment of linear component 2332 extending along the rotating shaft 2312 separately pass through the connection component 232. The end 2333 of the first segment of linear component 2331 and the end 2334 of the second segment of linear component 2332 are connected to the second body 220. When the second body 220 rotates relative to the first body 210 in the first direction, a rotation radius of the first segment of linear component 2331 is different from a rotation radius of the second segment of linear component 2332.

How to make the rotation radius of the first segment of linear component 2331 be different from the rotation radius of the second segment of linear component 2332 may be limited by different structures of the connection component 232, for example, the structures of the connection component 232 shown in FIG. 6, FIG. 7, or FIG. 8.

For example, if the connection component 232 includes the N groups of holes, the first segment of linear component 2331 extending out of the $i^{th}$ linear component 233 along the rotating shaft 2312 of the $i^{th}$ rotating shaft component 231 passes through the first hole 23211 in the $i^{th}$ group of holes 2321, and the second segment of linear component 2332 extending out of the linear component 233 along the rotating shaft 2312 of the $i^{th}$ rotating shaft component 231 passes through the second hole 23212.

Still referring to FIG. 5, on the $i^{th}$ rotating shaft component 231, the $i^{th}$ linear component is wound around the rotating shaft 2312, and a part shown in FIG. 233-A is a farthest end of the linear component 233 that is wound around the rotating shaft 2312. A segment of linear component (for example, the first segment of linear component 2331) extending out of the linear component 233 after the linear component 233 is wound around the rotating shaft 2312 passes through the first hole 23211 on an upper part. Correspondingly, the other segment of linear component (for example, the second segment of linear component 2332) extending out of the linear component 233 after the linear component 233 is wound around the rotating shaft 2312 passes through the second hole 23212 on a lower part. In addition, an end (for example, the end 2333 and the end 2334) of each segment of linear component is connected to the second body 220.

In this way, the N linear components are connected to the N rotating shaft components by using the N groups of holes of the connection component, to form a complete rotating shaft connection mechanism. A device with opening and closing performance is formed by connecting the connection component and the linear component to the device.

In this embodiment of this application, the linear component needs to have relatively good strength. Therefore, a metal wire or a nylon rope may be used as a material of the linear component.

Figure 9:
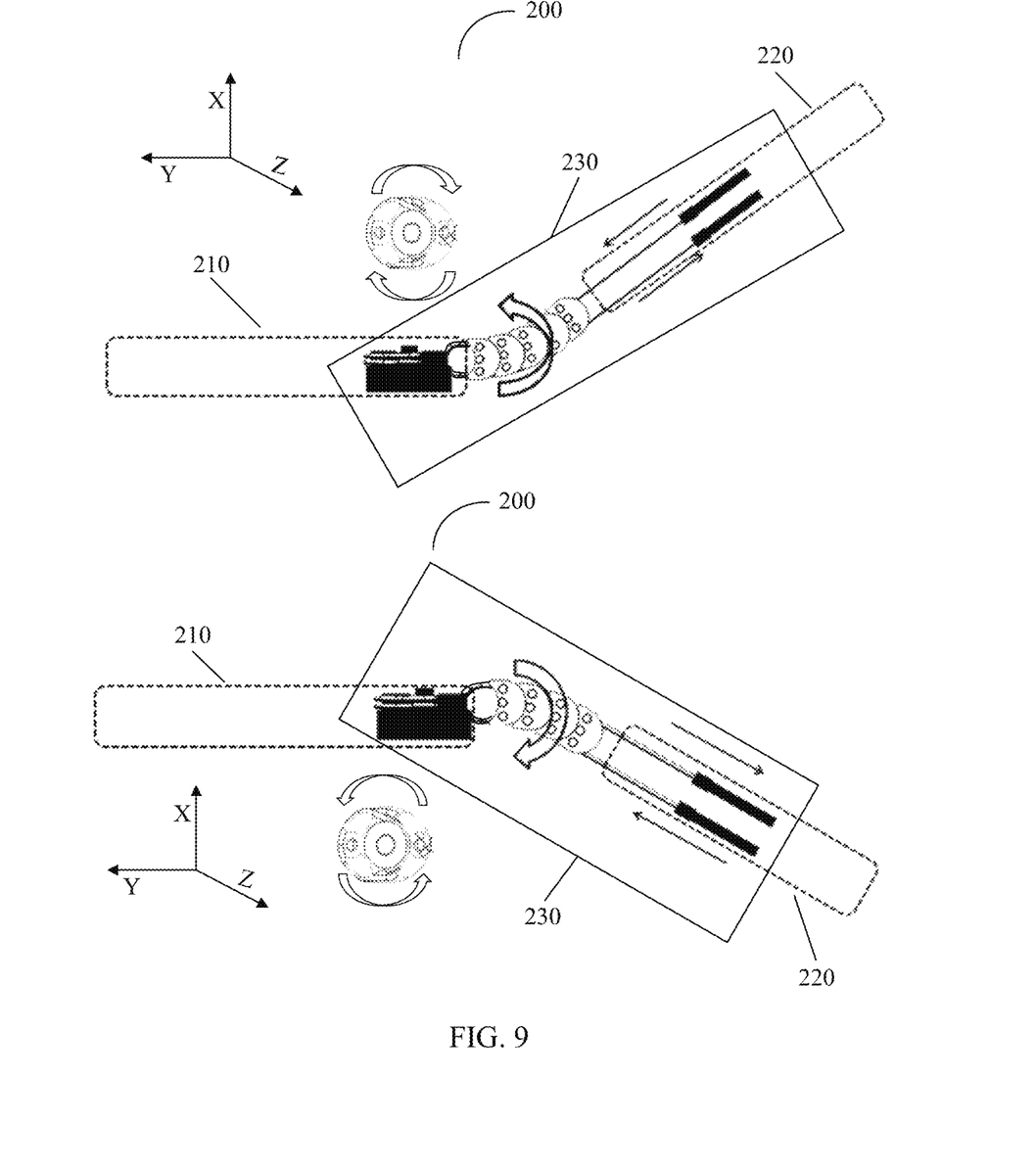
FIG. 9 is a schematic structural diagram of different states presented by a laptop computer in an opening and closing process according to an embodiment of this application.

FIG. 9 is a schematic structural diagram of different states presented by a laptop computer in an opening and closing process. The first diagram in FIG. 9 describes a process of closing the laptop computer, in other words, the second body 220 rotates upward relative to the first body 210. The second diagram in FIG. 9 shows a process of opening the laptop computer, in other words, the second body 220 rotates downward relative to the first body 210.

It should be noted that, according to the rotating shaft connection mechanism provided in this embodiment of this application, due to flexibility of the linear component, the second body may rotate relative to the first body in a length direction (that is, the first direction) of the first body, and may also rotate relative to the first body in another direction. This is not limited in this embodiment of this application.

Figure 10:
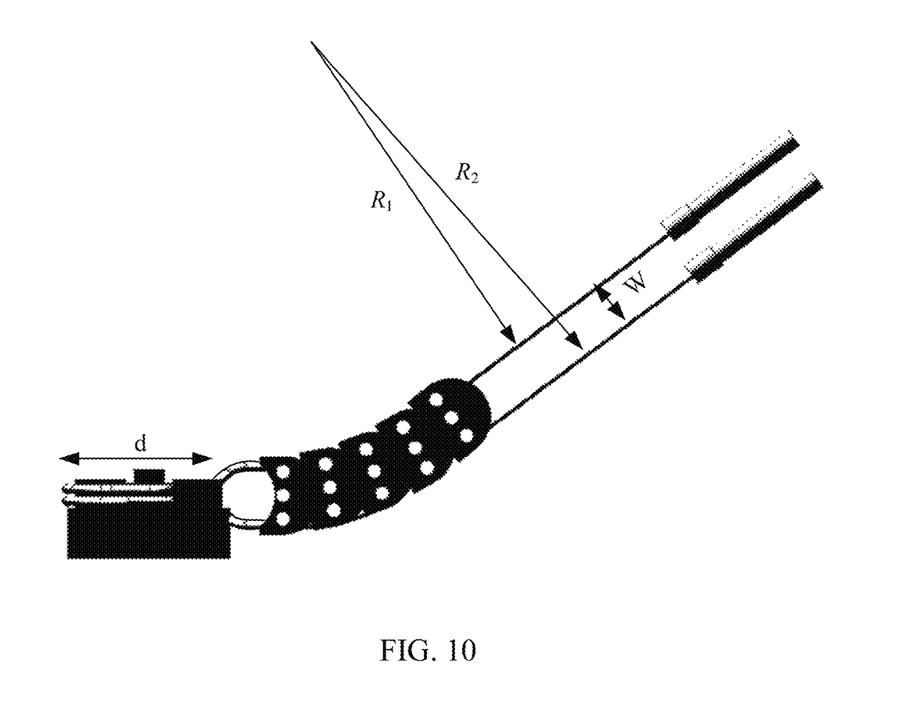
FIG. 10 is a schematic structural diagram of a laptop computer in an open state according to an embodiment of this application.

The following describes a working principle of an embodiment of this application with reference to FIG. 10.

FIG. 10 is a schematic structural diagram of a laptop computer in an open state. For ease of description, a motion track of rotation of the first body 210 relative to the second body 220 may be simply simulated as a circle. $R_1$ may be considered as a radius of an inner side of the linear component 233, and is referred to as an inner radius for short. $R_2$ may be considered as a radius of an outer side of the linear component 233, and is referred to as an outer radius for short. W is a distance between two holes, or in other words, W is a difference between the inner radius and the outer radius that are of the linear component 233, and d may be understood as a diameter of the rotating shaft 2312.

When the second body 220 rotates relative to the first body 210, because the inner radius and the outer radius that are of the linear component 233 are different, a length difference is generated between an edge of the inner side and an edge of the outer side of the linear component 233. The length difference may pull the rotating shaft 2312 of the rotating shaft component 231 by using the rotating shaft component 231, so that a friction force is generated between the rotating shaft 2312 and the linear component 233 wound around an outer wall of the rotating shaft 2312, to generate a torsion force, and to implement opening and closing performance of the laptop computer.

The following uses an example in which the first body 210 and the second body 220 are in a right-angle state. A rotation angle of the rotating shaft of the rotating shaft connection mechanism in this embodiment of this application is calculated based on the foregoing principle, and a reason why the rotating shaft connection mechanism in this embodiment of this application can effectively improve opening and closing durability of the laptop computer is further described.

$R_2 = R_1 + W$. When the first body 210 and the second body 220 are in the right-angle state, an arc length of the edge of the inner side of the linear component 233 is $L_3 = R_1 \times \pi/2$, an arc length of the edge of the outer side of the linear component 233 is $L_4 = R_2 \times \pi/2$, and the length difference between the edge of the inner side and the edge of the outer side that are of the linear component 233 is $\Delta L = (R_2 - R_1) \times \pi/2 = W \times \pi/2$. If a rotation angle of the rotating shaft 2312 is $R_3$ in a process in which the first body 210 and the second body 220 are opened from a closed state to a right angle, an arc length corresponding to the rotation angle $R_3$ is $L_5 = R_3 \times d/2$. It can be learned based on a principle of the rotating shaft connection mechanism that the length difference between the edge of the inner side of the linear component 233 and the edge of the outer side of the linear component 233 is equal to the arc length corresponding to the rotation angle of the rotating shaft 2312. Therefore, if $L_5 = R_3 \times d/2 = \Delta L = W \times \pi/2$, $R_3 = W \times \pi/d$.

Herein, if W=2 mm and d=12 mm, when the first body 210 and the second body 220 are in the right-angle state, $R_3 = \pi/6 = 30°$.

It can be learned from the foregoing calculation result that, when the first body 210 and the second body 220 are in the right-angle state, although the second body 220 rotates 90° relative to the first body 210, the rotating shaft 2312 actually rotates only 30°. However, in the prior art, the second body 220 rotates 90° relative to the first body 210, and the rotating shaft 2312 also rotates 90°.

Therefore, the N rotating shaft components, the N linear components, and the connection component are disposed on the device with opening and closing performance provided in this embodiment of this application. Two segments of linear components extending out of each linear component from a wound rotating shaft of a corresponding rotating shaft component separately pass through the connection component. When the second body rotates relative to the first body, the two segments of linear components of each linear component have different rotation radii. In this way, when the second body rotates relative to the first body, because the two segments of linear components of each linear component have different rotation radii, a length difference may be generated between the two segments of linear components. The length difference may pull the rotating shaft of the rotating shaft component, so that friction is generated between the rotating shaft and the linear component that is wound around an outer wall of the rotating shaft. This generates a torsion force, to effectively reduce a rotation angle of the rotating shaft, improve a service life of the rotating shaft connection mechanism, and improve opening and closing durability of the device.

In addition, compared with the prior art, when rotation angles of the rotating shaft are the same, this solution may further improve the opening and closing angle of the device.

And because a rotating shaft center of the rotating shaft connection mechanism does not need to coincide with a rotation center of the second body, a position of the rotating shaft connection mechanism may be flexibly placed.

To better control a torsion force value based on an actual requirement, this embodiment of this application further provides a possible implementation.

Figure 11:
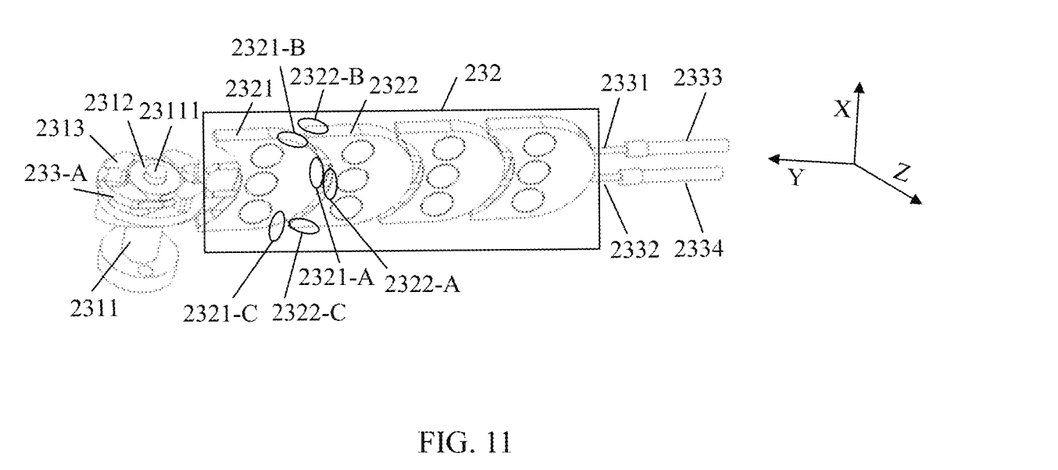
FIG. 11 is a schematic structural diagram of another rotating shaft connection mechanism according to an embodiment of this application.

As shown in FIG. 11, the $i^{th}$ rotating shaft component 231 further includes a friction sheet 2313. The rotating shaft 2312 is nested inside the friction sheet 2313, and the friction sheet 2313 is in contact with two opposite surfaces of the rotating shaft 2312. The $i^{th}$ linear component 233 is wound around the rotating shaft 2312 and the friction sheet 2313. 233-A shown in FIG. 11 is a farthest end of the $i^{th}$ linear component that is wound around the friction sheet 2313.

Herein, the linear component 233 is wound around the rotating shaft 2312 and the friction sheet 2313. When the second body 220 rotates relative to the first body 210, a torsion force may be provided by using a friction force between the rotating shaft 2312 and the friction sheet 2313 in a rotation process. Because there is a relatively large contact surface between the friction sheet 2313 and the rotating shaft 2312, a determined torsion force may be calculated by using a size of the contact surface, and a torsion force value may further be better controlled based on an actual requirement.

In this embodiment of this application, the connection component 232 may include a plurality of connection blocks. The plurality of connection blocks may be connected by using a component similar to a sleeve, or may be connected without using any component.

When the plurality of connection blocks are connected without using a component, a structure of the connection block itself may be used to keep the connection component 232 in a normal working state.

For example, a structure of the connection block may be the connection block shown in FIG. 11. A projection of each connection block on an XY-plane is similar to a semicircular shape. For any two adjacent connection blocks adjacent to each other (for example, a connection block 2321 and a connection block 2322), a convex part (a part indicated by 2321-A shown in FIG. 10) of a semicircular shape of the connection block 2321 extends into a concave part (a part indicated by 2322-A shown in FIG. 10) of a semicircular shape of the connection block 2322, or in other words, a convex part (a part indicated by 2321-A shown in FIG. 10) of the connection block 2321 in a Y direction extends into a concave part (a part indicated by 2322-A shown in FIG. 10) of the connection block 2322 in the Y direction. In addition, one end (2322-B shown in FIG. 10) of the concave part of the semicircular shape of the connection block 2322 is in contact with an area (2321-B shown in FIG. 10) of the convex part of the semicircular shape of the connection block 2321. Correspondingly, the other end (2322-C shown in FIG. 10) of the concave part of the semicircular shape of the connection block 2322 is also in contact with an area (2321-C shown in FIG. 10) of the convex part of the semicircular shape of the connection block 2321. In this way, the two adjacent connection blocks are connected.

In this connection manner, a length of the connection component 232 in a width direction can be flexibly controlled. For example, if a rotation angle of the linear component 233 is relatively large, this connection manner may automatically adjust to make coordination gap between two adjacent connection blocks larger, so that the length of the connection component 232 in the width direction becomes longer. If the rotation angle of the linear component 233 is relatively small, this connection manner may automatically adjust to make the coordination gap between the two adjacent connection blocks smaller, so that the length of the connection component 232 in the width direction is shorter.

The connection component is formed by the plurality of connection blocks, so that a motion direction of the second body relative to the first body is greatly increased, and the motion direction of the second body relative to the first body is less limited. For example, the second body may rotate relative to the first body in a length direction of the first body, and may also rotate relative to the first body in another direction.

It should be noted that the connection component 232 may alternatively include only one connection block with a relatively long width size. This is not limited in this embodiment of this application.

As described above, the rotating shaft connection mechanism 230 may include one or more rotating shaft components 210.

If the rotating shaft connection mechanism 230 includes an odd number of rotating shaft components 210, a rotating shaft component 210 may be placed at a central position of the first body 210 in the first direction (the length direction of the first body), and other rotating shaft components are symmetrically placed on two sides of the central position.

If the rotating shaft connection mechanism 230 includes an even number of rotating shaft components 210, the rotating shaft components 210 may be symmetrically placed on two sides of the central position of the first body 210 in the first direction (the length direction of the first body).

Still referring to FIG. 2, if N=2, the two rotating shaft components are symmetrically placed on the two sides of the central position.

It should be understood that the foregoing description of the rotating shaft connection mechanism by using an example in which the rotating shaft connection mechanism is applied to the laptop computer is merely an example, and shall not constitute any limitation on this application. Any rotating shaft connection mechanism to which the embodiments of this application are applied shall fall within the protection scope of this application.

It should be further understood that: that an element is "fastened to" another element described in the embodiments of this application may be understood as that the element may be "directly or indirectly fastened to" the another element. Similarly, that an element may be "connected" to another element described in the embodiments of this application may be understood as that the element may be "directly or indirectly connected" the another element.

It should be further understood that: that one direction "is parallel to" or "is perpendicular to" the other direction described in the embodiments of this application may be understood as that the direction "is approximately parallel to" or "is approximately perpendicular to" the other direction.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A device comprising:
   a first body;
   a second body coupled to the first body; and
   a rotating shaft connection mechanism coupled to the first body and the second body and comprising:
   N rotating shaft components, wherein an $i^{th}$ rotating shaft component of the N rotating shaft components comprises a rotating shaft, and wherein N is a positive integer greater than or equal to 1 and i is a positive integer;
   a connection component comprising:
   a first end coupled to the first body; and
   a second end coupled to the second body; and
   N movable linear components, wherein an $i^{th}$ linear component of the N movable linear components corresponds to the $i^{th}$ rotating shaft component and is wound around the rotating shaft, wherein the $i^{th}$ linear component comprises:
   a first segment coupled to the second body and configured to extend along the rotating shaft and pass through the connection component; and
   a second segment coupled to the second body and configured to extend along the rotating shaft and pass through the connection component,
   wherein a first rotation radius of the first segment is different from a second rotation radius of the second segment when the second body rotates relative to the first body in a first direction,
   wherein the first direction is perpendicular to a second direction,
   wherein the second direction extends from a first area of the first body away from the connection component to a second area of the first body that is closer to the connection component, and
   wherein a first plane of the first direction and the second direction is parallel to a second plane in which the first body faces a surface of the second body.

2. The device of claim 1, wherein the connection component comprises N groups of holes, wherein an $i^{th}$ group of holes of the N groups of holes corresponds to the $i^{th}$ rotating shaft component, and wherein the $i^{th}$ group of holes comprises:
   a first hole, wherein the first segment passes through the first hole; and
   a second hole, the wherein the second segment passes through the second hole.

3. The device of claim 2, wherein when the second body rotates relative to the first body in the first direction, a first distance between the first hole and the first plane is equal to a second distance between the second hole and the first plane, the first plane passes through a central position of the first body in the first direction, and the first plane is perpendicular to the first direction.

4. The device of claim 1, wherein the connection component comprises a plurality of connection blocks.

5. The device of claim 4, wherein a projection of each connection block on a second plane is in a semicircular shape, and wherein a convex part of a first semicircular shape of a first connection block of the connection blocks extends into a concave part of a second semicircular shape of a second connection block of the connection blocks.

6. The device of claim 1, wherein the $i^{th}$ rotating shaft component further comprises a friction sheet, wherein the rotating shaft is nested inside the friction sheet, wherein the friction sheet is in contact with two opposite surfaces of the rotating shaft, and wherein the $i^{th}$ linear component is wound around the rotating shaft and the friction sheet.

7. The device of claim 1, wherein the rotating shaft comprises two opposite surfaces, wherein the $i^{th}$ rotating shaft component further comprises a base coupled to the first body and is in contact with the two opposite surfaces, and wherein the base comprises a convex part.

8. The device of claim 1, wherein N=2, and wherein two rotating shaft components of the N rotating shaft components are symmetrically placed on two sides of a central position of the first body in the first direction.

9. The device of claim 1, wherein a first length of the connection component in the first direction is about equal to a second length of the first body in the first direction.

10. The device of claim 1, wherein the $i^{th}$ linear component comprises a metal wire or a nylon rope.

11. The device of claim 1, wherein the device is a laptop computer, wherein the first body comprises a chassis, and wherein the second body comprises a display.

12. The device of claim 5, wherein the convex part comprises two areas, wherein the concave part comprises two ends, wherein the two ends are in contact with the two areas, and wherein the second plane is perpendicular to the first direction.

13. The device of claim 7, wherein the rotating shaft is hollow, and wherein the convex part passes through the rotating shaft.

14. The device of claim 1, wherein a first length of the connection component in the first direction is about equal to a second length of the second body in the first direction.

15. The device of claim 1, wherein the $i^{th}$ linear component comprises a nylon rope.

16. A rotating shaft connection mechanism comprising:
   N rotating shaft components, wherein an $i^{th}$ rotating shaft component of the N rotating shaft components comprises a rotating shaft, and wherein N is a positive integer greater than or equal to 1 and i is a positive integer;
   a connection component comprising:
      a first end configured to be coupled to a first body; and
      a second end configured to be coupled to a second body; and
   N movable linear components, wherein an $i^{th}$ linear component of the N movable linear components corresponds to the $i^{th}$ rotating shaft component and is wound around the rotating shaft, wherein the $i^{th}$ linear component comprises:
      a first segment configured to be coupled to the second body and configured to extend along the rotating shaft and pass through the connection component; and
      a second segment configured to be coupled to the second body and configured to extend along the rotating shaft and pass through the connection component.

17. The rotating shaft connection mechanism of claim 16, wherein the first end is coupled to the first body and the second end is coupled to the second body, and wherein a first rotation radius of the first segment is different from a second rotation radius of the second segment when the second body rotates relative to the first body in a first direction.

18. The rotating shaft connection mechanism of claim 17, wherein the first direction is perpendicular to a second direction, wherein the second direction extends from a first area of the first body away from the connection component to a second area of the first body that is closer to the connection component, and wherein a first plane of the first direction and the second direction is parallel to a second plane in which the first body faces a surface of the second body.

19. The rotating shaft connection mechanism of claim 16, wherein the connection component comprises N groups of holes, wherein an $i^{th}$ group of holes of the N groups of holes corresponds to the $i^{th}$ rotating shaft component, and wherein the $i^{th}$ group of holes comprises:
   a first hole, wherein the first segment passes through the first hole; and
   a second hole, wherein the second segment passes through the second hole.

20. The rotating shaft connection mechanism of claim 16, wherein the connection component comprises a plurality of connection blocks.

* * * * *

UNITED STATES PATENT AND TRADEMARK OFFICE
CERTIFICATE OF CORRECTION

PATENT NO. : 11,409,334 B2
APPLICATION NO. : 17/253878
DATED : August 9, 2022
INVENTOR(S) : Kato et al.

Page 1 of 1

It is certified that error appears in the above-identified patent and that said Letters Patent is hereby corrected as shown below:

In the Claims

Claim 10, Column 15, Line 19: "a metal wire or a nylon rope." should read "a metal wire."

Signed and Sealed this
Fourth Day of October, 2022

Katherine Kelly Vidal
*Director of the United States Patent and Trademark Office*